Nov. 13, 1928.
A. J. WEST
1,691,689
VALVE
Filed Sept. 25, 1925
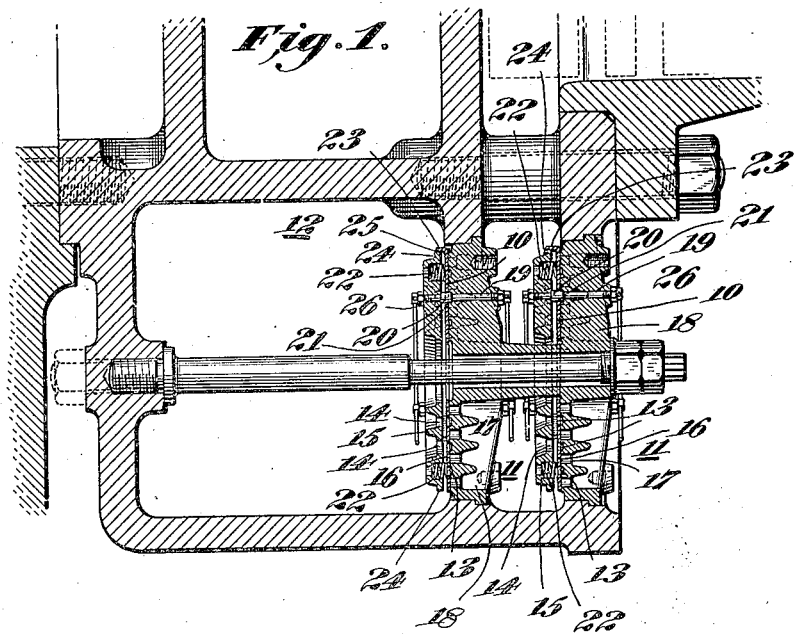
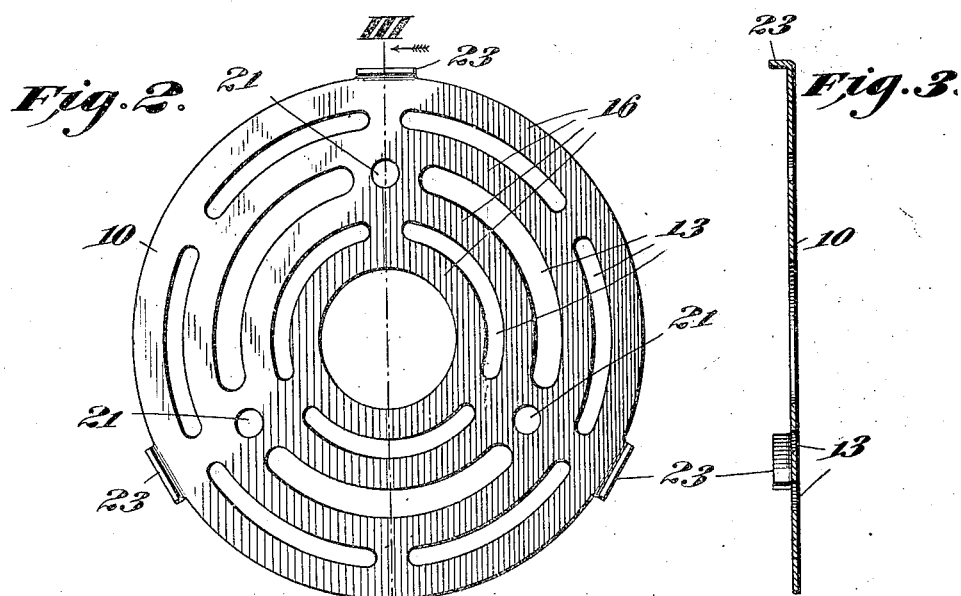
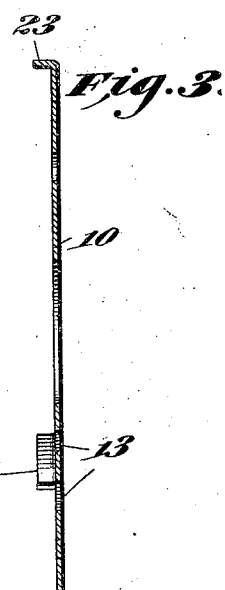
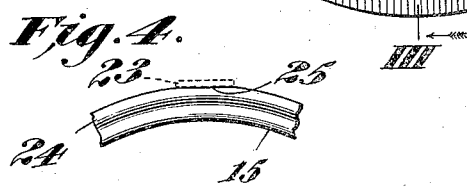
INVENTOR
Arthur J. West.
BY R. S. A. Dougherty
and A. B. Reavis
ATTORNEYS Patented Nov. 13, 1928.

1,691,689

UNITED STATES PATENT OFFICE.

ARTHUR J. WEST, OF BETHLEHEM, PENNSYLVANIA, ASSIGNOR TO BETHLEHEM STEEL COMPANY.

VALVE.

Application filed September 25, 1925. Serial No. 58,647.

My invention relates to valves of the plate type and it has for an object to so support valves of this character that they shall be maintained in registry with their co-operative seats much longer than is possible with known types of construction.

Plate valves are commonly maintained in place or guided by pins passing through openings therein. Owing to the limited area of engagement between the pins and the walls of the openings, the latter wear in an oblong manner; and, due to this wear, registration of a plate valve with respect to its seat member is disturbed, whereupon such valve must be discarded. In accordance with my invention, I overcome this point of weakness in existing types of construction and greatly increase the durability of plate valves by providing the latter with laterally-extending lips adapted to bear on suitable faces provided on the seat construction, the lips sustaining the weight or load of the valve in service. These lips may be made sufficiently wide to secure such distribution of the load as to prolong the life of the valve. I preferably provide a plurality of laterally-extending lips which are spaced equi-distantly angularly so that, should a lip wear excessively or be broken, the plate valve may be removed and turned angularly to bring another lip into co-operation with the load sustaining face; and, furthermore, should the part of the seat construction having the load sustaining bearing surface or face be worn to such an extent as to disturb the registering relation, the part or member having such load sustaining faces or surfaces may be removed and turned angularly in order to bring another surface into position to sustain the load of the valve.

Apparatus made in accordance with my invention is illustrated in the accompanying drawings, forming a part of this application, in which:

Fig. 1 is a sectional detail view of apparatus having my improved valve construction applied thereto;

Fig. 2 is a side elevation of my improved plate valve;

Fig. 3 is a sectional view taken along the line III—III of Fig. 2 and viewed in the direction of the arrows; and, Fig. 4 is a fragmentary view showing means for sustaining my improved plate valve.

In the drawings, I show plate valves 10 carried by seat constructions 11 fixed in position with respect to any suitable apparatus 12, for example, a compressor. Each plate valve is provided with any suitable arrangement of passages 13 adapted to register with similarly disposed passages 14 in a backing member 15 of the seat construction. The passages 13 in the disc valve 10 leave solid portions 16 adapted to cover and lap passages 17 in the seat member 18 of a seat construction.

Each backing member 15 is supported from its seat member 18 by studs 19, such studs preferably having intermediate spacing portions 20 of larger diameter. The disc valve 10 is provided with openings 21 to fit the portions 20 of the studs. Suitable spring 22 are arranged between the backing member 15 and the disc valve 10 to bias the latter toward the seat member 18. The structure so far described is well known, it being the usual practice to have the plate valve supported and guided by the openings thereof fitting the studs carried by the seat member.

In accordance with my invention, the load or weight of the valve 10 is not borne by the walls of the openings 21, as heretofore, but, on the contrary, I provide such valve with laterally-extending lips 23 for cooperation with a suitable load-sustaining bearing surface or face on the seat construction. For example, I show the backing member 15 provided with an outwardly-extending rib or flange 24 having bearing surfaces or faces 25 spaced equi-distantly angularly.

Each seat construction and its plate valve are arranged vertically in service. With this arrangement, the backing member 15 and the plate valve 10 are so arranged that, in whatever manner the backing member 15 and the plate valve 10 are assembled with respect to the seat member 18, such backing member will have one of its load bearing faces disposed substantially horizontally at the uppermost portion of the backing member and one of the lips 23 on the plate valve will be similarly disposed for cooperation with such uppermost bearing face or surface.

From the structure described, it will be noted that the load-sustaining lips 23, as well as the bearing faces 25 on the backing member 15, may be made of any suitable width in order to secure such distribution of load as to provide for a long life of the lip and of its cooperating load-sustaining bearing face or surface. Should a lip wear or be broken, the nuts 26 on the studs 19 may be removed, permitting of withdrawal of the backing member 15; and, thereafter the plate valve 10 may be removed and turned angularly to bring one of the other lips into the uppermost position, whereupon the plate valve and the backing member are again placed on the studs and the nuts 26 screwed up. In case the active load-sustaining bearing surface 25 should become unduly worn, the nuts 26 may be removed and the backing member 15 withdrawn from the studs and turned angularly in order to bring one of the other bearing surfaces or faces 25 into the uppermost position, whereupon the backing member is again placed in position.

Upon reference to Fig. 2, it will be noted that the passages 13 and the portions of solid material 16 between median radii passing through the lips 23 are similar. In like manner, the seat member 18 and the backing member 15 are provided with similar groups of passages. This permits of the plate valve 10 and of the backing member 15 being turned angularly in order to bring new load-supporting portions into cooperation. As shown on the drawings, there are three load supporting parts or portions on the backing member 15 and on the plate valve 10, and there are, of course, three groups of similarly arranged passages; although, it is to be understood that any suitable number of load-sustaining portions or parts may be provided on the backing member and on the plate valve if such portions or parts are equi-distantly spaced angularly and have included between them groups of similarly arranged passages and valve parts.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention what I claim as new and desire to secure by Letters Patent is:

1. In a valve, the combination of a substantially vertically-disposed seat construction, a substantially vertically-disposed plate valve, means for guiding and positioning the plate valve relative to the seat construction, said means normally tending to produce substantial wear on the comparatively thin material of the plate valve, laterally-extending bearing means on the seat construction, and a plurality of laterally-extending lips equidistantly spaced angularly for engagement with said bearing means, said bearing means on the seat construction and the laterally-extending lips being adapted to reduce the wear on the thin metal of the plate valve.

2. In a valve, the combination of a substantially vertically-disposed seat construction, a substantially vertically-disposed plate valve, means for guiding and positioning the plate valve relative to the seat construction, flat bearing portions on the seat construction and extending laterally thereof, and lips extending laterally of the plate valve and having flat bearing faces for engagement with ing flat bearing portions, independent of the said bearing portions, independent of the plate valve guiding and positioning means.

3. In a valve, the combination of a substantially vertically-disposed seat construction consisting of spaced seat and backing members, a substantially vertically-disposed plate valve interposed between the members, means for guiding and positioning the plate valve relative to the seat construction, said means normally tending to produce substantial wear on the comparatively thin material of the plate valve, bearing portions carried by one of the members, and laterally extending lips on the plate valve for engagement with the bearing portions, said bearing means on the seat construction and the laterally-extending lips being adapted to reduce the wear on the thin metal of the plate valve.

4. In a valve, the combination of a substantially vertically-disposed seat construction, a substantially vertically-disposed plate valve, means for guiding and positioning the plate valve relative to the seat construction, said means normally tending to produce substantial wear on the comparatively thin material of the plate valve, a substantially horizontal bearing portion at the upper part of the seat construction, and a laterally-extending lip on the valve for engagement with the bearing portion to sustain the load or weight of the valve, said bearing means on the seat construction and the laterally-extending lips being adapted to reduce the wear on the thin metal of the plate valve.

5. In a valve, the combination of a seat member, a backing member, studs carried by the seat member for detachably supporting and spacing the backing member with respect to the seat member, a plate valve arranged between the backing and seat members and having openings for the studs, a plurality of bearing faces spaced equi-distantly angularly on the backing member and so arranged that when in position the uppermost of said faces will be substantially horizontal, and a plurality of lips extending laterally from the plate valve and spaced equi-distantly angularly and the uppermost one of said lips being arranged to engage the uppermost one of said bearing faces to sustain the weight or load of the valve in service.

In testimony whereof I hereunto affix my signature this eighteenth day of September, 1925.

ARTHUR J. WEST.